US009565216B2

(12) United States Patent
Khalil et al.

(10) Patent No.: US 9,565,216 B2
(45) Date of Patent: Feb. 7, 2017

(54) METHODS, SYSTEMS, AND COMPUTER PROGRAM PRODUCTS FOR SECURITY PROTOCOL SELECTION IN INTERNET PROTOCOL MULTIMEDIA SUBSYSTEM NETWORKS

(71) Applicant: AT&T Intellectual Property I, L.P., Atlanta, GA (US)

(72) Inventors: Mohamed Khalil, Murphy, TX (US); Arun Chatterjee, Sammamish, WA (US); Mazen Aladwin, Sammamish, WA (US); Karl Schlieber, Kirkland, WA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 76 days.

(21) Appl. No.: 14/523,397

(22) Filed: Oct. 24, 2014

(65) Prior Publication Data
US 2016/0119378 A1 Apr. 28, 2016

(51) Int. Cl.
*H04L 29/06* (2006.01)
*H04W 12/08* (2009.01)
(52) U.S. Cl.
CPC ......... *H04L 63/205* (2013.01); *H04L 65/1006* (2013.01); *H04L 65/1016* (2013.01); *H04L 65/1073* (2013.01); *H04W 12/08* (2013.01)
(58) Field of Classification Search
CPC ... H04L 63/205; H04L 65/1006; H04W 12/08; H04W 60/00
See application file for complete search history.

(56) References Cited

U.S. PATENT DOCUMENTS

| 5,784,566 | A | * | 7/1998 | Viavant | H04L 63/0428 709/229 |
| 6,694,431 | B1 | * | 2/2004 | Binding | H04L 63/0428 713/152 |
| 7,434,258 | B2 | | 10/2008 | Bajko et al. | |
| 7,600,116 | B2 | | 10/2009 | Bajko et al. | |

(Continued)

FOREIGN PATENT DOCUMENTS

KR 20110029694 A 3/2011

OTHER PUBLICATIONS

J. Rosenberg et al. "SIP: Session Initiation Protocol", RFC 3261, Jun. 2002, retrieved at: [http://www.rfc-base.org/txt/rfc-3261.txt] on Mar. 2, 2016.*

(Continued)

*Primary Examiner* — Robert Leung
(74) *Attorney, Agent, or Firm* — Akerman LLP; Mammen (Roy) P. Zachariah, Jr.; Michael K. Dixon

(57) ABSTRACT

A method includes receiving a first secured registration request message from user equipment at a registration server in an Internet Protocol multimedia subsystem network, the first secured registration request message being secured using a first security protocol, determining at the registration server that the first secured registration request message cannot be decoded using the first security protocol, sending a message from the registration server to the user equipment proposing a second security protocol, and receiving a second secured registration request message from the user equipment at the registration server, the second secured registration request message being secured using the second security protocol.

20 Claims, 7 Drawing Sheets

(56) References Cited

U.S. PATENT DOCUMENTS

| | | | |
|---|---|---|---|
| 8,028,161 B2 | 9/2011 | Kröselberg | |
| 8,056,124 B2 | 11/2011 | Bassett et al. | |
| 8,306,531 B2 | 11/2012 | Zhu et al. | |
| 8,369,313 B2 | 2/2013 | Lu et al. | |
| 8,433,907 B2 | 4/2013 | Hjelm et al. | |
| 8,442,489 B2 | 5/2013 | Adams et al. | |
| 8,582,766 B2 | 11/2013 | Yan | |
| 9,185,088 B1* | 11/2015 | Bowen | H04L 63/0471 |
| 2008/0010688 A1 | 1/2008 | Cai et al. | |
| 2010/0095361 A1 | 4/2010 | Wang | |
| 2011/0320569 A1* | 12/2011 | Kim | H04L 65/1093 |
| | | | 709/217 |
| 2012/0066737 A1* | 3/2012 | Zhang | H04L 63/20 |
| | | | 726/1 |
| 2012/0117619 A1* | 5/2012 | Jactat | H04L 63/205 |
| | | | 726/2 |
| 2013/0254531 A1 | 9/2013 | Liang et al. | |
| 2014/0122874 A1 | 5/2014 | Janakiraman et al. | |

OTHER PUBLICATIONS

"Bonus Material: Security in the LTE-SAE Network", LTE and the Evolution to 4G Wireless, Design and Measurement Challenges, Agilent Technologies, Retrieved Date: Oct. 8, 2014, www.aqilent.com/find/lte (38 pages).

Rehman, Aftab Ur, "Investigation of Interworked IMS Architecture in Terms of Traffic Security", Master Thesis in Electrical Engineering Department of Telecommunication Engineering Blekinge Institute of Technology, MSc Electrical Engineering Program, BTH Sweden, 2009 (74 pages).

Sher, Muhammad, Secure Service Provisioning (SSP) Framework for IP Multimedia Subsystem (IMS), Technical University of Berlin, Berlin, 2007 (224 pages).

* cited by examiner

METHODS, SYSTEMS, AND COMPUTER PROGRAM PRODUCTS FOR SECURITY PROTOCOL SELECTION IN INTERNET PROTOCOL MULTIMEDIA SUBSYSTEM NETWORKS

BACKGROUND

The present disclosure relates generally to computer system and network security and, more particularly, to methods, systems, computer program products for selecting a security protocol in a network.

The Internet Protocol (IP) Multimedia Subsystem (IMS) is a standard that has been developed to define the control and integration of multimedia services in a core, packet-switched network. In particular, the IMS architecture defines a set of logical functions that use a signaling protocol known as the session initiation protocol (SIP) to establish communication sessions in an IP network. A "session" may be, for example, a one-to-one voice call or a more complex interaction, such as a one-to-many conference call involving multimedia services. SIP may also be used to facilitate voice over IP (VoIP) services, in which voice is transported in IP data packets that are re-assembled and converted into an audio signal for the recipient. Referring to FIG. 1, an IMS network 100 may be characterized as a standardized way to connect IP devices 10, 20, such as cell phones WiFI-equipped computing devices, conventional telephones, modems, etc., and networks using SIP.

Referring now to FIG. 2, when a user device, which may be referred to as User Equipment (UE), attempts to register with an IMS network, the UE sends the IMS network an IMS registration request, which includes a list of security protocols that the UE supports. In the example shown in FIG. 2, the UE supports security protocols Triple Data Encryption Standard (3des) and Advanced Encryption Standard (AES). The IMS network selects the 3des security protocol and returns a 401 SIP response code informing the UE that user authentication is required using 3des. The UE responds with a secured registration request message using the 3des security protocol, which the IMS network decrypts to recover the original plaintext registration message. The IMS network responds by sending the 200 SIP response code to the UE to notify the UE that the registration request was successful.

In some instances, however, the IMS network and the UE implement a security protocol differently or the UE may be infected with a virus. Such an example is illustrated in FIG. 3. In this case, the UE supports 3des and AES. The IMS network selects the 3des security protocol and returns a 401 SIP response code informing the UE that user authentication is required using 3des. The UE responds with a secured registration request message using the 3des protocol, which the IMS network is unable to decode. After not receiving a response from the IMS network for a certain period of time, a timer expires at the UE and the UE re-sends the secured registration request message using the 3des protocol. The IMS network remains unable to decode this registration request resulting in the UE repeating this process of retrying to register N times after which it will give up. The multiple retry attempts by the UE for what is ultimately a futile effort to register may waste network resources.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the disclosure.

Some embodiments provide a method comprising receiving a first secured registration request message from user equipment at a registration server in an Internet Protocol multimedia subsystem network, the first secured registration request message being secured using a first security protocol, determining at the registration server that the first secured registration request message cannot be decoded using the first security protocol, sending a message from the registration server to the user equipment proposing a second security protocol, and receiving a second secured registration request message from the user equipment at the registration server, the second secured registration request message being secured using the second security protocol.

In other embodiments, the method further comprises decoding the second secured registration request message at the registration server using the second security protocol.

In still other embodiments, the method further comprises determining at the registration server that the second secured registration request message cannot be decoded using the second security protocol.

In still other embodiments, the method further comprises sending a disable message to the user equipment to disable functionality in the user equipment used for registering the user equipment with the Internet Protocol multimedia subsystem network.

In still other embodiments, the method further comprises receiving a security protocol identification message from the user equipment at the registration server in the Internet Protocol multimedia system network, the security protocol identification message identifying a list of security protocols supported by the user equipment and comprising the first security protocol and the second security protocol, which are ordered by preference, with the first security protocol being indicated as more preferred relative to the second security protocol by the user equipment and sending a message from the registration server to the user equipment proposing the first security protocol. The first secured registration request message is received from the user equipment at the registration server responsive to sending the message from the registration server to the user equipment proposing the first security protocol.

In still other embodiments, the first security protocol comprises one of triple data encryption standard protocol and advanced encryption standard protocol.

In still other embodiments, the second security protocol comprises one of triple data encryption standard (3des) protocol and advanced encryption standard (AES) protocol.

In still other embodiments, the registration server and the user equipment communicate using session initiation protocol.

In further embodiments, a method comprises receiving a security protocol identification message from user equipment at a registration server in an Internet Protocol multimedia system network, the security protocol identification message identifying a list of security protocols supported by the user equipment and comprising a first security protocol and a second security protocol, which are ordered by preference, with the first security protocol being indicated as more preferred relative to the second security protocol by the user equipment, sending a message from the registration server to the user equipment proposing the second security protocol, and receiving a secured registration request message from the user equipment at the registration server, the secured registration request message being secured using the second security protocol.

In still further embodiments, the method further comprises decoding the secured registration request message at the registration server using the second security protocol.

In still further embodiments, the first security protocol comprises one of triple data encryption standard protocol and advanced encryption standard protocol.

In still further embodiments, the second security protocol comprises one of triple data encryption standard protocol and advanced encryption standard protocol.

In other embodiments, a system comprises a processor and a memory that is coupled to the processor and comprises computer readable program code embodied in the memory that when executed by the processor causes the processor to perform operations comprising: receiving a first secured registration request message from user equipment at a registration server in an Internet Protocol multimedia subsystem network, the first secured registration request message being secured using a first security protocol, determining at the registration server that the first secured registration request message cannot be decoded using the first security protocol, sending a message from the registration server to the user equipment proposing a second security protocol, and receiving a second secured registration request message from the user equipment at the registration server, the second secured registration request message being secured using the second security protocol.

In still other embodiments, the operations further comprise decoding the second secured registration request message at the registration server using the second security protocol.

In still other embodiments, the operations further comprise determining at the registration server that the second secured registration request message cannot be decoded using the second security protocol.

In still other embodiments, the operations further comprise sending a disable message to the user equipment to disable functionality in the user equipment used for registering the user equipment with the Internet Protocol multimedia subsystem network.

In still other embodiments, the operations further comprise receiving a security protocol identification message from the user equipment at the registration server in the Internet Protocol multimedia system network, the security protocol identification message identifying a list of security protocols supported by the user equipment and comprising the first security protocol and the second security protocol, which are ordered by preference, with the first security protocol being indicated as more preferred relative to the second security protocol by the user equipment and sending a message from the registration server to the user equipment proposing the first security protocol. The first secured registration request message is received from the user equipment at the registration server responsive to sending the message from the registration server to the user equipment proposing the first security protocol.

In still other embodiments, the first security protocol comprises one of triple data encryption standard protocol and advanced encryption standard protocol.

In still other embodiments, the second security protocol comprises one of triple data encryption standard protocol and advanced encryption standard protocol.

In still other embodiments, the registration server and the user equipment communicate using session initiation protocol.

Other methods, systems, articles of manufacture, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

Other features of exemplary embodiments will be more readily understood from the following detailed description of specific embodiments thereof when read in conjunction with the accompanying drawings, in which.

DETAILED DESCRIPTION

Figure 1:
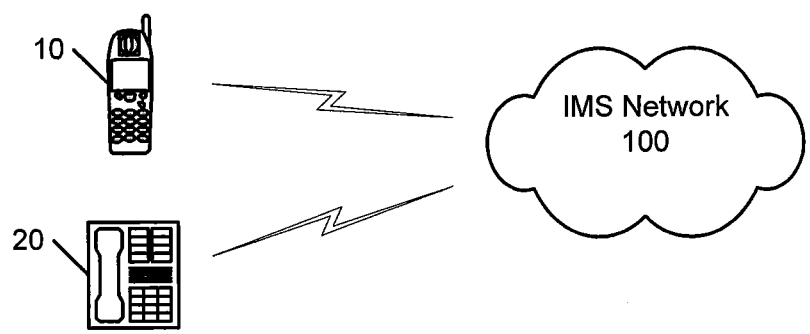
FIG. 1 is a block diagram of an Internet Protocol (IP) Multimedia Subsystem (IMS) network.
Figure 2:
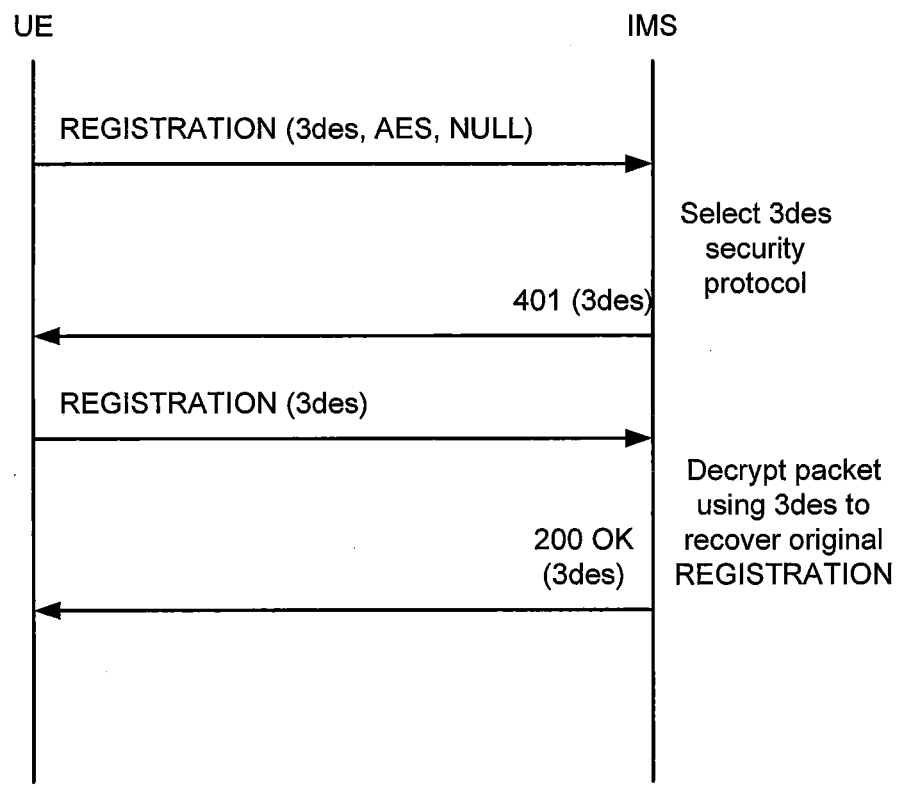
FIGS. 2 and 3 are message flow diagrams that illustrate registration of user equipment (UE) in an IMS network.

As will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

As used herein, the term "User Equipment (UE)" refers to a terminal or device that may communicate using the Session Initiation Protocol (SIP). It will be understood that UE may also refer to devices that communicate using SIP via a media gateway, which translates communications, for example, between an IP network and another network, such as the public switched telephone network or a circuit switched wireless network. As used herein, the term "message" means a unit of information and/or a block of data that may be transmitted electronically as a whole or via segments from one device or system to another. Accordingly, as used herein, the term "message" may encompass such terms of art as "frame" and/or "packet," which may also be used to refer to a unit of transmission.

When a user device attempts to register with an IMS network it sends the registration server (P-CSCF) a request to register including a list of security algorithms it supports. Sometimes the network and user device implement the security protocol differently or the user device is infected with a virus. In this case the registration will fail, but the user device will retry multiple times. This ultimately results in a failure to register, but wastes network resources in the multiple (futile) attempts to register.

In some embodiments, when there is a failure in registering User Equipment (UE) using a first security protocol (e.g., 3des), the IMS network proposes a second protocol (e.g., AES), which is successful. If the second protocol happens to not succeed, then it is likely the UE is infected with a virus and the IMS network disables the UE.

In other embodiments, rather than attempt to register a UE using the first option in a list of security protocols that the UE provides in its registration request message, the IMS network selects the security protocol that it believes will have the best chance of registering the UE successfully. For example, the UE may send a list of protocols with 3des listed first (most preferred) and AES listed second (less preferred). The IMS network replies informing the UE that it should continue the registration process using AES as the IMS network believes this is the best protocol to use for this registration.

Figure 4:
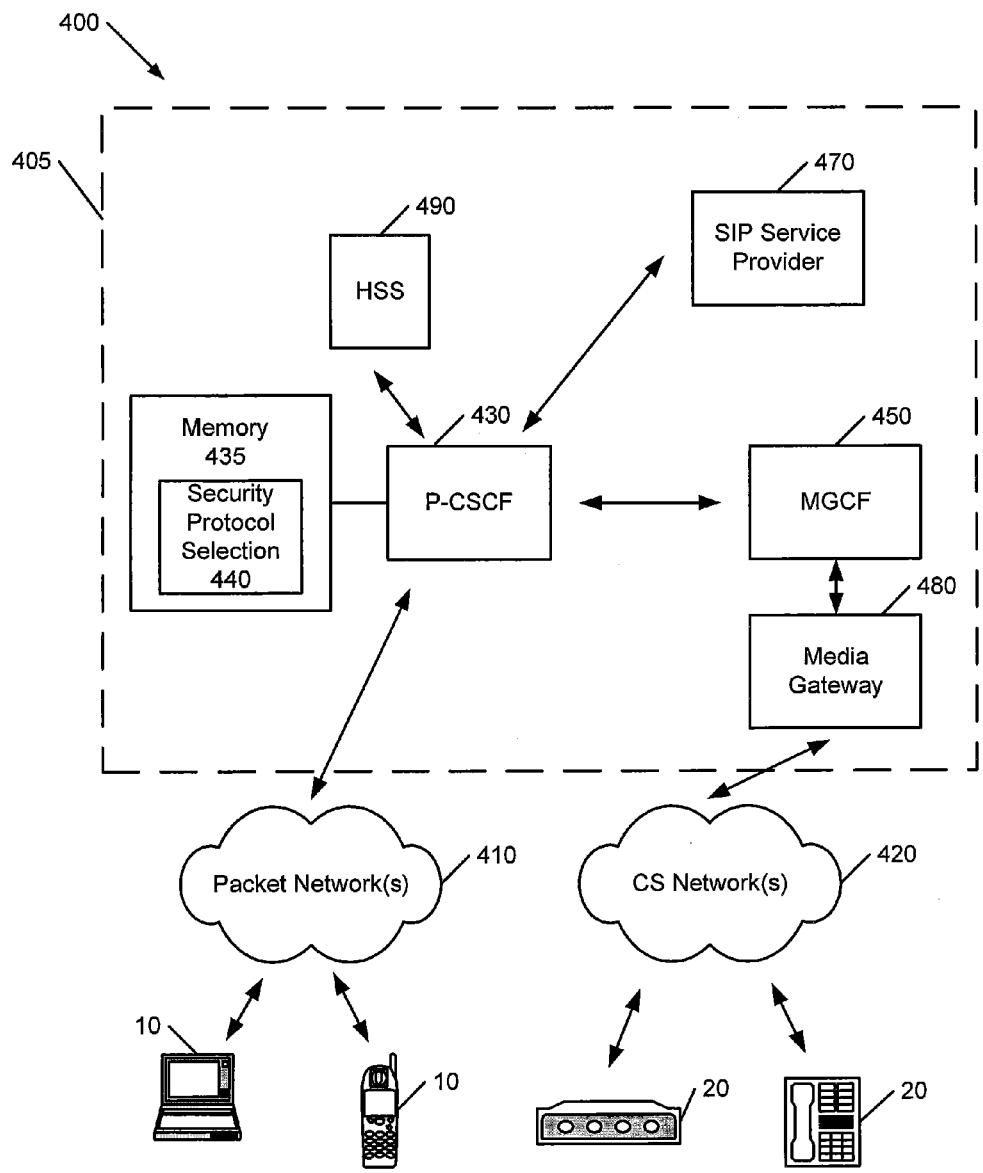
FIG. 4 is a block diagram of an IMS network including a registration server having a security protocol selection module according to some embodiments.

Referring to FIG. 4, an exemplary communication network 100, according to some embodiments, includes an IMS network 405 that is coupled to packet switching network(s) 410 and circuit switched network(s) 420, which may provide connectivity to the IMS network 405 for devices 10, 20, such as cell phones, WiFi-equipped computing devices, conventional telephones, modems, and other devices. A device may connect to the IMS network 405 using any of a number of different interfaces, generally depending on the nature of the device. The devices 10, 20 may include IP devices that are capable of communicating via SIP.

The IMS network 405 includes apparatus configured to provide a variety of different functions linked by standardized interfaces. Generally, functions of the IMS network 405 include a bundle of functions of SIP servers or proxies, collectively referred to as a Call Session Control Function (CSCF), which are used to process SIP signaling packets in the IMS network 405. Functions of the CSCF may include: registration of devices with the IMS network 405; routing and inspection of signaling messages; authentication of users and establishment of security associations; compression, decompression and other signal processing functions; authorization of resources; policy enforcement; bandwidth management; and generation of charging records. These functions may be apportioned among several call session control function proxies or servers, such as a Proxy-CSCF (P-CSCF) 430, Media Gateway Control Function (MGCF) 450, Interrogating-CSCF (I-CSCF), Serving-CSCF (S-CSCF), and various other functions, gateways and the like.

The P-CSCF 430 may be configured as a SIP proxy to function as an interface to the IMS network 105 for IP terminals/devices 10, 20. The P-CSCF 430 may include one or more servers or data processing systems to enable the registration of IP terminals/devices and the routing of SIP and/or HTTP signaling messages between the devices 10, 20 and service providers, such as the SIP Service Provider 470. The P-CSCF 430 may communicate with devices 10 via the packet network(s) 410 and may communicate with devices 20 via MGCF 450, a media gateway 480, and circuit switched network(s) 420. The MGCF 450 may enable SIP signaling to inter-work with other types of signaling used by the media gateway 480. Thus, the combination of the MGCF 450 and the media gateway 480 may provide an interface between the SIP signaling used in the IMS network 405 and the signaling used in the circuit switched network(s) 420.

A Home Subscriber Server (HSS) database 490 may maintain a service profile and other information for each end-user and associated IP terminal/device that has registered with the IMS network 405. The profile and other information may include, but is not limited to, IP address information, roaming information, and/or telephony services information.

The devices 10 and/or 20 may desire to access a Web or browser based service. A Web service is a reusable piece of software that interacts by exchanging messages over a network. Commonly, Web services use Simple Object Access Protocol (SOAP), a protocol for exchanging XML-based messages. A common messaging pattern in SOAP is the Remote Procedure Call (RPC) pattern, in which one a Web service requester sends a request message to a Web Service Provider, and the Web Service Provider sends a response message that provides the requested service, for example, the result of applying a particular procedure based on parameters passed in the Web service request.

As described above, the P-CSCF 430 may comprise a registration server registering devices 10 and 20, which may be referred to as User Equipment (UE) with the IMS network. The P-CSCF 430 including the registration server may be implemented as a single server, separate servers, or a network of servers either co-located in a server farm, for example, or located in different geographic regions. In some embodiments, these servers may be implemented as virtual servers on a single hardware platform. As shown in FIG. 4, the P-CSCF 430 is equipped with a memory 435 that is representative of the one or more memory devices containing the software and data used by a registration server, for example, in registering UE with the IMS network 405. The memory 435 may contain a security protocol selection module 440 that is configured to communicate with UE during the registration process to agree upon a security protocol to be used in registering the UE device with the IMS network 405 and in establishing communication sessions over the IMS network 405.

The various elements of the communication network of FIG. 4 may be connected by a global network, such as the Internet or other publicly accessible network. Various elements of the network may be interconnected by a wide area network, a local area network, an Intranet, and/or other private network, which may not be accessible by the general public. Thus, the communication network may represent a combination of public and private networks or a virtual private network (VPN).

Although FIG. 4 illustrates an exemplary communication network and an exemplary hardware/software architecture that may be used in data processing systems, such as the P-CSCF 430 for selecting a security protocol when registering a UE, it will be understood that embodiments are not limited to such a configuration but are intended to encompass any configuration capable of carrying out operations as described herein. Moreover, the functionality of the P-CSCF 430 of FIG. 4 may be implemented as a single processor system, a multi-processor system, a multi-core processor system, or even a network of stand-alone computer systems, in accordance with various embodiments.

Computer program code for carrying out operations of data processing systems and servers described above with respect to FIG. 4, such as the P-CSCF 430, may be written in a high-level programming language, such as Java, C, and/or C++, for development convenience. In addition, computer program code for carrying out operations of embodiments may also be written in other programming languages, such as, but not limited to, interpreted languages. Some modules or routines may be written in assembly language or even micro-code to enhance performance and/or memory usage. Embodiments described herein, however, are not limited to any particular programming language. It will be further appreciated that the functionality of any or all of the program modules may also be implemented using discrete hardware components, one or more application specific integrated circuits (ASICs), or a programmed digital signal processor or microcontroller.

Exemplary embodiments are described herein with reference to message flow, flowchart, and/or block diagram illustrations of methods, systems, and computer program products in accordance with some embodiments. These message flow, flowchart, and/or block diagrams further illustrate exemplary operations for security protocol selection in registering UE in an IMS network, in accordance with some embodiments. It will be understood that each block of the message flow, flowchart, and/or block diagram illustrations, and combinations of blocks in the message flow, flowchart, and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the message flow, flowchart, and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the message flow, flowchart, and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the message flow, flowchart, and/or block diagram block or blocks.

Figure 5:
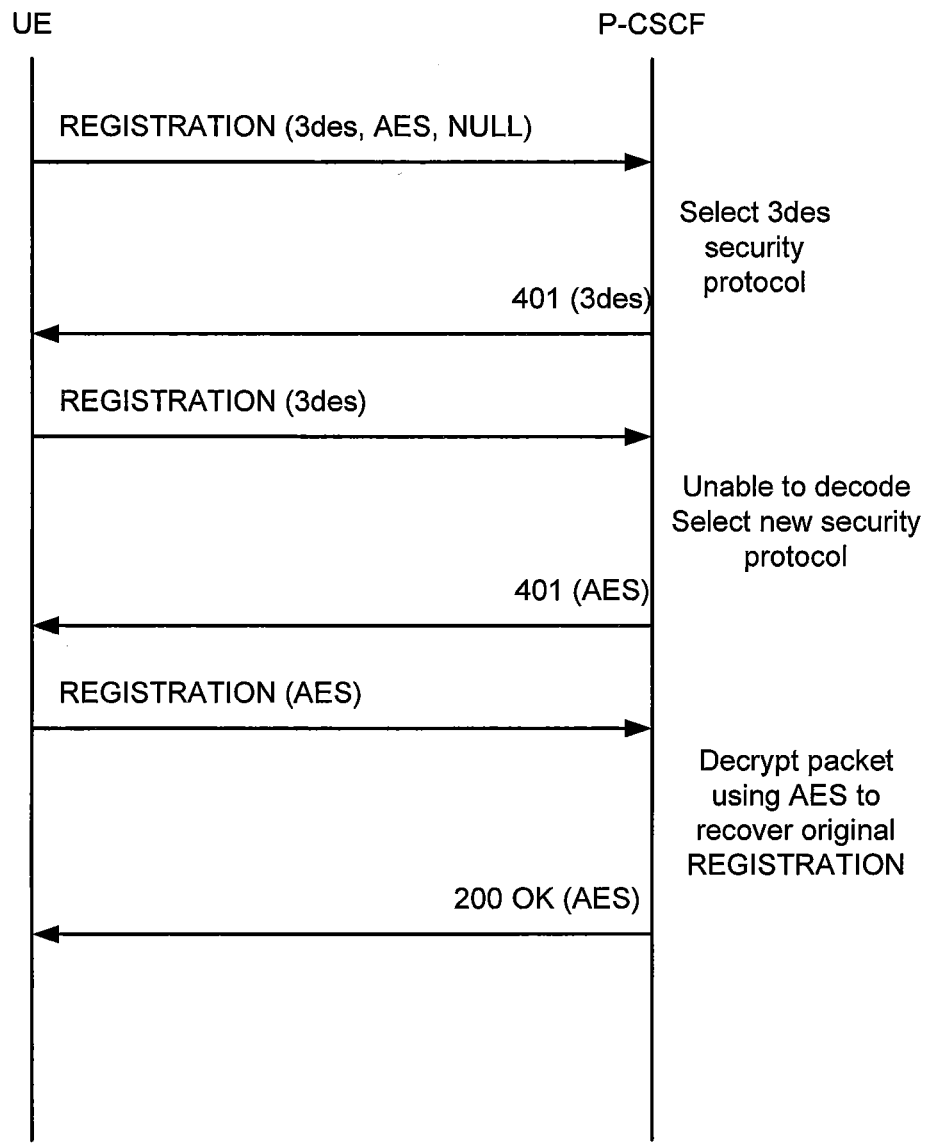
FIGS. 5-7 are message flow diagrams that illustrate operations for security protocol selection in registering UE in an IMS network according to some embodiments.

Referring now to FIG. 5, exemplary operations for security protocol selection in registering UE in an IMS network according to some embodiments begin with the UE sending the P-CSCF registration server an IMS registration request, which may be viewed as a security protocol identification message that includes a list of security protocols that the UE supports. In the example shown in FIG. 5, the UE supports security protocols 3des and AES. The P-CSCF registration server selects the 3des security protocol and returns a 401 SIP response code informing the UE that user authentication is required using 3des. The UE responds with a first secured registration request message using the 3des protocol, which the P-CSCF registration server is unable to decode. The P-CSCF registration server sends a message to the UE proposing AES as a new security protocol through use of a 401 SIP response code. The UE responds with a second secured registration request message using the AES protocol, which the P-CSCF registration server decrypts to recover the original plaintext registration message. The P-CSCF registration server responds by sending the 200 SIP response code to the UE to notify the UE that the registration request was successful.

Figure 3:
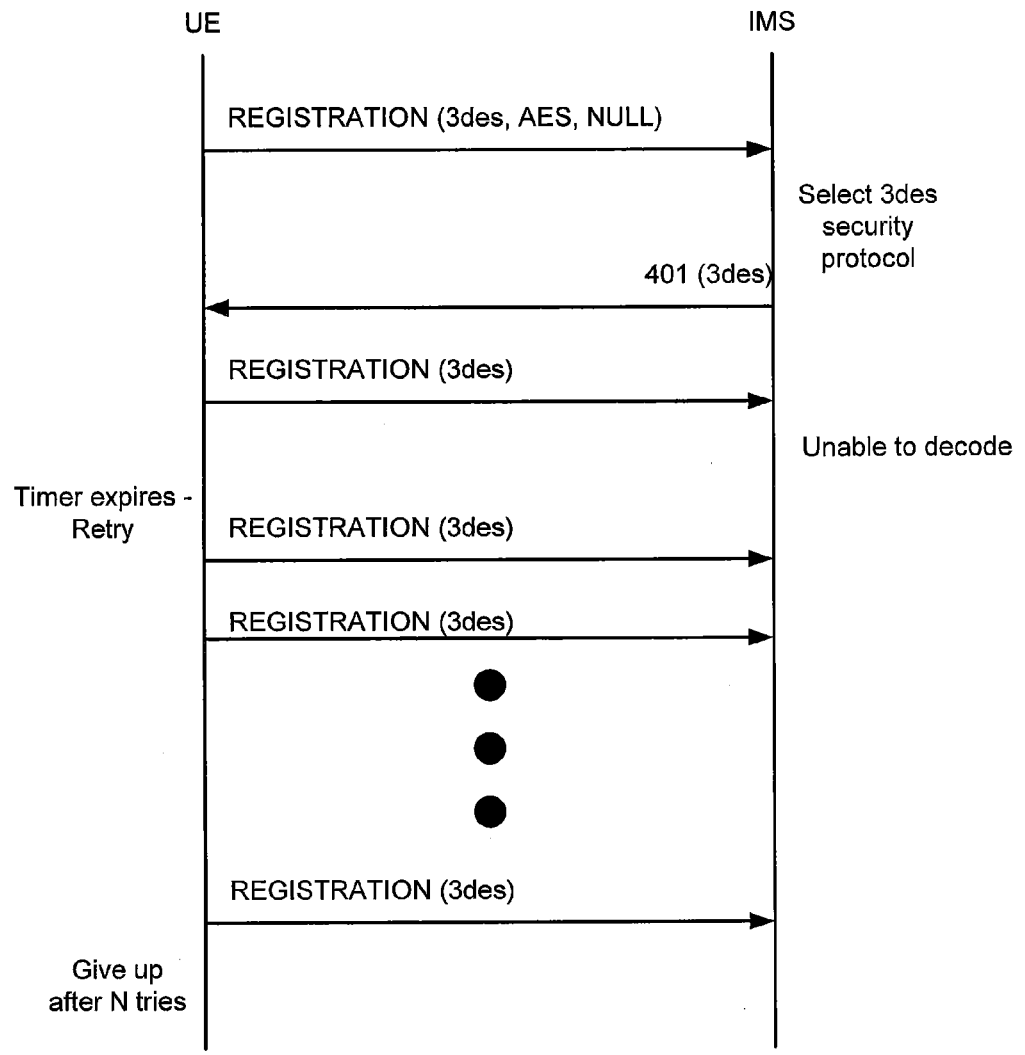

By switching to a second supported security protocol, the UE is able to register without going through numerous retry attempts as described above with respect to FIG. 3, which ultimately may prove futile and may waste network resources. As a result, network resource utilization is improved by reducing retry attempts and/or using a more efficient security protocol.

Figure 6:
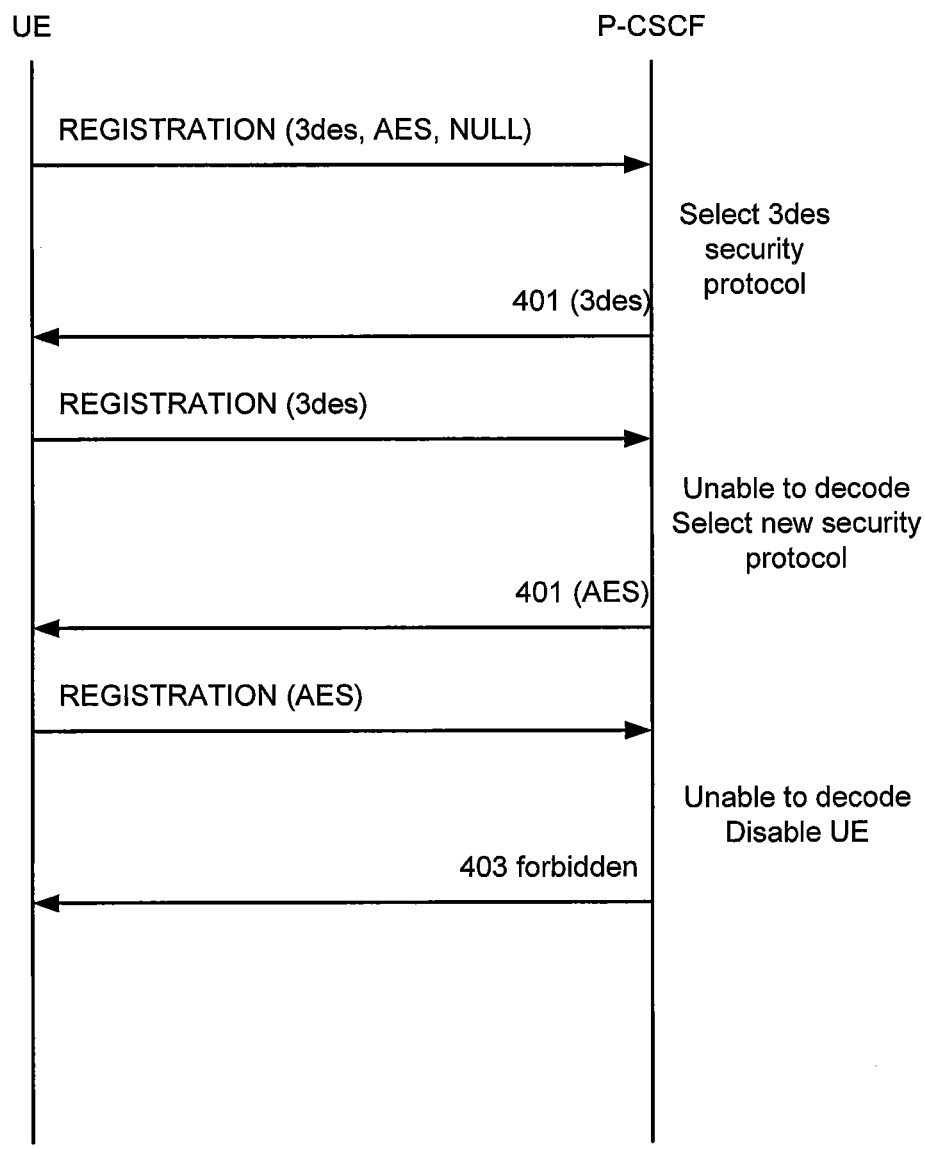

Referring now to FIG. 6, exemplary operations for security protocol selection in registering UE in an IMS network according to further embodiments begin with the UE sending the P-CSCF registration server an IMS registration request, which may be viewed as a security protocol identification message that includes a list of security protocols that the UE supports. In the example shown in FIG. 6, the UE supports security protocols 3des and AES. The P-CSCF registration server selects the 3des security protocol and returns a 401 SIP response code informing the UE that user authentication is required using 3des. The UE responds with a first secured registration request message using the 3des protocol, which the P-CSCF registration server is unable to decode. The P-CSCF registration server sends a message to the UE proposing AES as a new security protocol through use of a 401 SIP response code. The UE responds with a second secured registration request message using the AES protocol, which the P-CSCF registration server is also unable to decode. As the P-CSCF registration server has been unable to decode a registration request message from the UE using two different security protocols, there is a risk that the UE is infected with a virus or some other type of malware. To prevent the UE from further attempts at registering with the IMS network, the P-CSCF registration server sends a 403 SIP response code FORBIDDEN to the UE to disable functionality in the UE used for registering the UE with the IMS network. An operator may need to intervene to enable the UE to subsequently attempt to register with the IMS network.

By disabling the UE after unsuccessful attempts to register the UE using at least two different security protocols, the risk of security threats to the IMS network may be mitigated as the UE may be affected by a virus or other type of malware and/or under the control of a hostile party.

Figure 7:
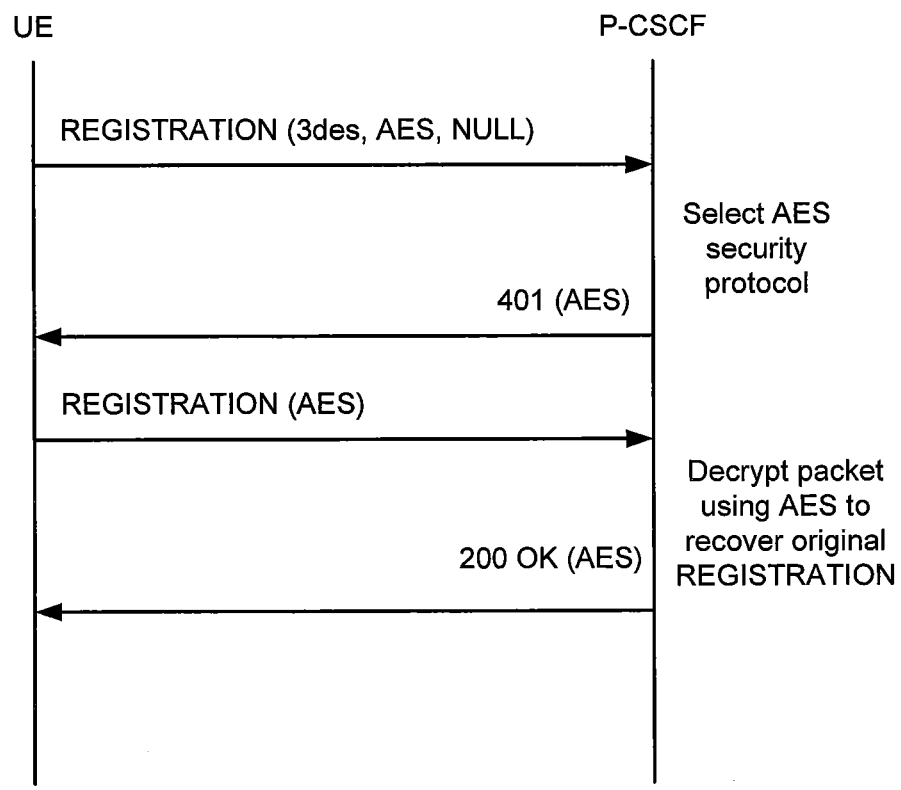

Referring now to FIG. 7, exemplary operations for security protocol selection in registering UE in an IMS network according to still further embodiments begin with the UE sending the P-CSCF registration server an IMS registration request, which may be viewed as a security protocol identification message that includes a list of security protocols that the UE supports. In the example shown in FIG. 6, the UE supports security protocols 3des and AES. The list may order the security protocols by preference from most preferred by the UE to least preferred by the UE. In the example shown in FIG. 7, the 3des protocol is most preferred by the UE with the AES protocol least preferred. Nevertheless, the P-CSCF registration server determines that the AES protocol would be the best security protocol to use to register the UE with to protect the security of the IMS network. As a result, the P-CSCF registration server selects the AES security protocol and returns a 401 SIP response code informing the UE that user authentication is required using AES instead of the UE's preferred security protocol of 3des. The UE responds with a secured registration request message using the AES protocol, which the P-CSCF registration server decrypts to recover the original plaintext registration message. The P-CSCF registration server responds by sending the 200 SIP response code to the UE to notify the UE that the registration request was successful.

By selecting a security protocol that the P-CSCF registration server determines to provide greater security for the IMS network as opposed to complying with the UE's preference in security protocols, the P-CSCF registration server can improve network security.

The message flow diagrams of FIGS. 5-7 illustrate the architecture, functionality, and operations of some embodiments of methods, systems, and computer program products for security protocol selection in registering UE in an IMS network. In this regard, each block represents a module, segment, or portion of code, which comprises one or more executable instructions for implementing the specified logical function(s). It should also be noted that in other implementations, the function(s) noted in the blocks may occur out of the order noted in FIGS. 5-7. For example, two blocks shown in succession may, in fact, be executed substantially concurrently or the blocks may sometimes be executed in the reverse order, depending on the functionality involved.

According to some embodiments, when there is a failure in registering a UE using a first security protocol (e.g., 3des), the P-CSCF registration server proposes a second algorithm (e.g., AES), which may be successful. If the second security protocol happens to not succeed, then the UE may be infected with a virus and/or be under the control of a hostile party. In this case, the P-CSCF registration server disables the user equipment.

In other embodiments, rather than attempt to register a UE using the preferred option of security algorithms in a list that the user device provides in its registration security protocol identification message, the P-CSCF registration server selects the security algorithm that it believes will have the best chance of registering the device successfully and/or may provide the best security. For example, the UE may send a list of security protocols with 3des listed first and AES listed second. The P-CSCF registration server replies informing the UE that it should continue the registration process using AES as the P-CSCF registration server believes this is the best protocol to use for this registration.

The embodiments described above may provide an improved user experience by reducing the number of retry attempts to register a UE with an IMS network, may provide improved network security by selecting a more secure protocol over one preferred by the UE, e.g., AES over 3des, may save network resources by reducing the number of registration retry attempts, and/or may reduce security threats by disabling a UE that may be infected by a virus and/or under the control of a hostile party.

The message flow, flowchart, and block diagrams in the figures illustrate the architecture, functionality, and operation of possible implementations of systems, methods, and computer program products according to various aspects of the present disclosure. In this regard, each block in the message flow, flowchart, or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams, message flow, and/or flowchart illustration, and combinations of blocks in the block diagrams, message flow, and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items. Like reference numbers signify like elements throughout the description of the figures.

Many variations and modifications can be made to the embodiments without substantially departing from the principles of the present invention. All such variations and modifications are intended to be included herein within the scope of the present invention, as set forth in the following claims.

That which is claimed:

1. A method, comprising:
receiving, at a registration server in an internet protocol multimedia subsystem network, a security protocol identification message from user equipment, wherein the security protocol identification message identifies a list of security protocols supported by the user equipment and comprising a first security protocol, a second security protocol, and a third security protocol, which are ordered by preference, with the first security protocol being indicated as more preferred relative to the second security protocol by the user equipment, wherein the security protocol identification message is received prior to receiving a first secured registration request message from the user equipment;
sending, prior to receiving the first secured registration request message from the user equipment, a message from the registration server to the user equipment proposing the first security protocol;
receiving, at the registration server in the internet protocol multimedia subsystem network, the first secured registration request message from the user equipment, wherein the first secured registration message is secured using the first security protocol, wherein the first secured registration request message is received from the user equipment at the registration server in response to sending the message from the registration server to the user equipment proposing the first security protocol;
determining, at the registration server, that the first secured registration request message cannot be decoded using the first security protocol;
determining, based on the list of security protocols that includes the first security protocol, the second security protocol, and the third security protocol, that the third security protocol is associated with a greater probability of successful registration of the user equipment than the second security protocol even though the second security protocol is preferred by the user equipment over the third security protocol;
sending, to the user equipment, a message from the registration server proposing the third security protocol; and
receiving, at the registration server, a second secured registration request message from the user equipment, wherein the second secured registration request message is secured using the third security protocol.

2. The method of claim 1, further comprising receiving an additional request to register the user equipment with the internet protocol multimedia subsystem if registration of the user equipment fails.

3. The method of claim 1, further comprising:
decoding the second secured registration request message at the registration server using the third security protocol.

4. The method of claim 1, further comprising:
determining at the registration server that the second secured registration request message cannot be decoded using the third security protocol.

5. The method of claim 4, further comprising:
sending a disable message to the user equipment to disable functionality in the user equipment used for registering the user equipment with the internet protocol multimedia subsystem network.

6. The method of claim 1, wherein the first security protocol comprises one of triple data encryption standard protocol and advanced encryption standard protocol.

7. The method of claim 1, wherein the second security protocol comprises one of triple data encryption standard protocol and advanced encryption standard protocol.

8. The method of claim 1, wherein the registration server and the user equipment communicate using session initiation protocol.

9. A non-transitory computer-readable medium comprising instructions, which, when loaded and executed by a processor, cause the processor to perform operations, the operations comprising:
receiving, at a registration server in an internet protocol multimedia subsystem network, a security protocol identification message from user equipment, wherein the security protocol identification message identifies a list of security protocols supported by the user equipment and comprising a first security protocol, a second security protocol, and a third security protocol, which are ordered by preference, with the first security protocol being indicated as more preferred relative to the second security protocol by the user equipment, wherein the security protocol identification message is received prior to receiving a first secured registration request message from the user equipment;

sending, prior to receiving the first secured registration request message from the user equipment, a message from the registration server to the user equipment proposing the first security protocol;

receiving, at the registration server in the internet protocol multimedia subsystem network, the first secured registration request message from the user equipment, wherein the first secured registration message is secured using the first security protocol, wherein the first secured registration request message is received from the user equipment at the registration server in response to sending the message from the registration server to the user equipment proposing the first security protocol;

determining, at the registration server, that the first secured registration request message cannot be decoded using the first security protocol;

determining, based on the list of security protocols that includes the first security protocol, the second security protocol, and the third security protocol, that the third security protocol is associated with a greater probability of successful registration of the user equipment than the second security protocol even though the second security protocol is preferred by the user equipment over the third security protocol;

sending, to the user equipment, a message from the registration server proposing the third security protocol; and receiving, at the registration server, a second secured registration request message from the user equipment, wherein the second secured registration request message is secured using the third security protocol.

10. The non-transitory computer-readable medium of claim 9, wherein the operations further comprise:
decoding the secured registration request message at the registration server using the third security protocol.

11. The non-transitory computer-readable medium of claim 9, wherein the first security protocol comprises one of triple data encryption standard protocol and advanced encryption standard protocol.

12. The non-transitory computer-readable medium of claim 9, wherein the second security protocol comprises one of triple data encryption standard protocol and advanced encryption standard protocol.

13. A system, comprising:
a processor; and
a memory that is coupled to the processor and comprises computer readable program code embodied in the memory that when executed by the processor causes the processor to perform operations comprising:
receiving, at a registration server in an internet protocol multimedia subsystem network, a security protocol identification message from user equipment, wherein the security protocol identification message identifies a list of security protocols supported by the user equipment and comprising a first security protocol, a second security protocol, and a third security protocol, which are ordered by preference, with the first security protocol being indicated as more preferred relative to the second security protocol by the user equipment, wherein the security protocol identification message is received prior to receiving a first secured registration request message from the user equipment;

sending, prior to receiving the first secured registration request message from the user equipment, a message from the registration server to the user equipment proposing the first security protocol;

receiving, at the registration server in the internet protocol multimedia subsystem network, the first secured registration request message from the user equipment, wherein the first secured registration message is secured using the first security protocol, wherein the first secured registration request message is received from the user equipment at the registration server in response to sending the message from the registration server to the user equipment proposing the first security;

determining, at the registration server, that the first secured registration request message cannot be decoded using the first security protocol;

determining, based on the list of security protocols that includes the first security protocol, the second security protocol, and the third security protocol, that the third security protocol is associated with a greater probability of successful registration of the user equipment than the second security protocol even though the second security protocol is preferred by the user equipment over the third security protocol;

sending, to the user equipment, a message from the registration server proposing the third security protocol; and receiving, at the registration server, a second secured registration request message from the user equipment, wherein the second secured registration request message is secured using the third security protocol.

14. The system of claim 13, wherein the operations further comprise receiving an additional request to register the user equipment with the internet protocol multimedia subsystem if registration of the user equipment fails.

15. The system of claim 13, wherein the operations further comprise:
decoding the second secured registration request message at the registration server using the third security protocol.

16. The system of claim 13, wherein the operations further comprise:
determining at the registration server that the second secured registration request message cannot be decoded using the third security protocol.

17. The system of claim 16, wherein the operations further comprise:
sending a disable message to the user equipment to disable functionality in the user equipment used for registering the user equipment with the internet protocol multimedia subsystem network.

18. The system of claim 13, wherein the first security protocol comprises one of triple data encryption standard protocol and advanced encryption standard protocol.

19. The system of claim 13, wherein the second security protocol comprises one of triple data encryption standard protocol and advanced encryption standard protocol.

20. The system of claim 13, wherein the registration server and the user equipment communicate using session initiation protocol.

* * * * *